(12) United States Patent
Coleman et al.

(10) Patent No.: US 9,561,780 B2
(45) Date of Patent: Feb. 7, 2017

(54) VEHICLE WINDOW WIPER ASSEMBLY WITH CURVILINEAR GUIDE RAIL

(71) Applicant: FORD GLOBAL TECHNOLOGIES, LLC, Dearborn, MI (US)

(72) Inventors: James Coleman, Boston, MA (US); Brad Napier Doman, Ann Arbor, MI (US); Jose Garcia Crespo, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 112 days.

(21) Appl. No.: 14/336,015

(22) Filed: Jul. 21, 2014

(65) Prior Publication Data
US 2016/0016539 A1    Jan. 21, 2016

(51) Int. Cl.
*B60S 1/36* (2006.01)
*B60S 1/34* (2006.01)

(52) U.S. Cl.
CPC .............. *B60S 1/36* (2013.01); *B60S 1/3402* (2013.01); *B60S 1/3436* (2013.01); *B60S 1/3443* (2013.01); *B60S 1/3459* (2013.01); *B60S 1/3497* (2013.01); *B60S 1/365* (2013.01)

(58) Field of Classification Search
CPC .......... B60S 1/36; B60S 1/365; B60S 1/3402; B60S 1/3436; B60S 1/3443; B60S 1/3459; B60S 1/3497
USPC ......................... 15/250.351, 250.21, 250.23
See application file for complete search history.

(56) References Cited

U.S. PATENT DOCUMENTS

| | | | |
|---|---|---|---|
| 2,158,254 A * | 5/1939 | Rosenberg | B60S 1/28 15/250.23 |
| 2,790,195 A * | 4/1957 | Wrobel | B60S 1/3406 15/250.23 |
| 3,831,220 A | 8/1974 | Gmeiner et al. | |
| 4,570,283 A | 2/1986 | Osterday | |
| 4,701,971 A | 10/1987 | Prohaska | |
| 4,787,115 A * | 11/1988 | Clokie | B60S 1/365 15/250.21 |

(Continued)

FOREIGN PATENT DOCUMENTS

| | | |
|---|---|---|
| CA | 1066859 A | 11/1979 |
| DE | 3339414 A1 | 5/1985 |

(Continued)

OTHER PUBLICATIONS

Selveraj, Subramaniam; "Design and Development of an Automatic Wiper Retractor System"; Project Report to the faculty of Mechanical Engineering at the Universiti Teknikal Malaysia Melaka; May 2008; 24 pages.

*Primary Examiner* — Gary Graham
(74) *Attorney, Agent, or Firm* — Jason Rogers; King & Schickli, PLLC

(57) ABSTRACT

A windshield wiper assembly includes a telescoping wiper head having a first section fixed to a pivot drive shaft and a second section capable of translating relative to the first section between an extended position and a retracted position. A curvilinear guide rail engages the second section and guides the second section between the extended and retracted positions. A wiper blade is carried on the second section. Advantageously the wiper assembly functions to provide enhanced wiper coverage over the Zone B portion of the windscreen through which the occupants view is typically directed.

11 Claims, 6 Drawing Sheets

(56) References Cited

U.S. PATENT DOCUMENTS

| | | |
|---|---|---|
| 4,813,095 A | 3/1989 | Sato |
| 4,868,947 A | 9/1989 | Sahara |
| 6,772,470 B2 | 8/2004 | Zimmer |
| 6,976,285 B1 | 12/2005 | Scholl et al. |
| 7,076,829 B2 | 7/2006 | Ritt |
| 8,522,392 B2 | 9/2013 | Garcia Crespo et al. |
| 2011/0239396 A1 | 10/2011 | Boland |
| 2013/0333186 A1 | 12/2013 | Boland |

FOREIGN PATENT DOCUMENTS

| | | | |
|---|---|---|---|
| EP | 0250294 A1 | | 12/1987 |
| EP | 0236757 | * | 4/1990 |
| WO | 98/09852 | * | 3/1998 |

* cited by examiner

VEHICLE WINDOW WIPER ASSEMBLY WITH CURVILINEAR GUIDE RAIL

TECHNICAL FIELD

This document relates generally to vehicle window wiper systems and, more particularly, to a window wiper assembly of relatively simple structure that provides for increased sweep area toward a corner of the window opposite the wiper drive shaft.

BACKGROUND

FIG. 1 is a schematical illustration of a vehicle windscreen W illustrating the Zone B regulated wiper zone. In North America, SAE J903a, mandates 94% minimum wiper coverage of Zone B.

Typically, on tandem systems, the distance from the wiper drive shaft to the side of the windscreen at the park position limits the length of the wiper blade on the passenger side of a vehicle. As a result, the wiper blade is challenged to meet the Zone B wiper coverage requirement when windshield aspect ratio, given overall geometry, is more squared than rectangular. To satisfy Zone B minimum coverage, opposed or n-bar mechanisms are commonly used, leading to complex, heavy and high cost designs. Examples of n-bar wiper mechanisms are found in U.S. Pat. Nos. 6,772,470, 6,976,285 and 7,076,829.

This document relates to a new windshield wiper assembly of less complicated and less expensive construction than state of the art n-bar mechanisms. Advantageously, this new windshield wiper assembly is less expensive to produce, meets Zone B minimum coverage requirements and operates reliably over a long service life. As such, it represents a significant advance in this art field.

SUMMARY

In accordance with the purposes and benefits described herein a windshield wiper assembly is provided comprising a telescoping wiper head having a first section fixed to a pivot driveshaft and a second section capable of translating relative to the first section between an extended position and a retracted position. The windshield wiper assembly further includes a fixed guide rail engaging the second section and guiding the second section between the two positions. In addition a wiper blade is carried on the second section. The guide rail defines a modified arc of wiper blade travel matched to the windshield being wiped so as to provide enhanced Zone B wiper coverage of the windshield.

In one possible embodiment the assembly further includes a guide rail follower carried on the second section. The guide rail follower includes opposed rollers and the guide rail passes between and engages the opposed rollers. In one possible embodiment, the guide rail follower includes a first roller and a rotating bridge plate carrying a second roller and a third roller.

The windshield wiper assembly may be alternatively described as comprising a pivot housing, a pivot shaft and a drive motor for rotating the pivot shaft. Further the wiper assembly includes a curvilinear guide rail fixed to the pivot housing. A telescoping wiper arm includes a first section fixed to the pivot shaft and a second section displaceable relative to the first section between a retracted position and an extended position. A guide rail follower carried on the second section engages and follows the curvilinear guide rail so as to displace the second section between the retracted and extended positions as the first section is pivoted by the pivot shaft. Further a wiper blade is carried on the second section to clean the windshield.

The first section of the telescoping wiper arm includes a socket. The second section includes a lug that freely slides in the socket. A slide bearing is received in the socket between the first section and the lug. Further the curvilinear guide rail is engaged on a first face by the first roller of the guide rail follower and on a second face by the second and third rollers of the guide rail follower. The curvilinear guide rail includes a mounting base and the pivot housing includes mounting points for engaging the mounting face. In addition the pivot shaft extends through a first opening in the pivot housing and a second opening in the mounting base.

In the following description, there is shown and described several preferred embodiments of the windshield wiper assembly. As it should be realized, the windshield wiper assembly is capable of other, different embodiments and its several details are capable of modification in various, obvious aspects all without departing from the windshield wiper assembly as set forth and described in the following claims. Accordingly, the drawings and descriptions should be regarded as illustrative in nature and not as restrictive.

BRIEF DESCRIPTION OF THE DRAWINGS

The accompanying drawings incorporated herein and forming a part of the specification, illustrate several aspects of the windshield wiper assembly and together with the description serve to explain certain principles thereof. In the drawings.

Reference will now be made in detail to the present preferred embodiments of the windshield wiper assembly, examples of which are illustrated in the accompanying drawings.

DETAILED DESCRIPTION

Figure 2:
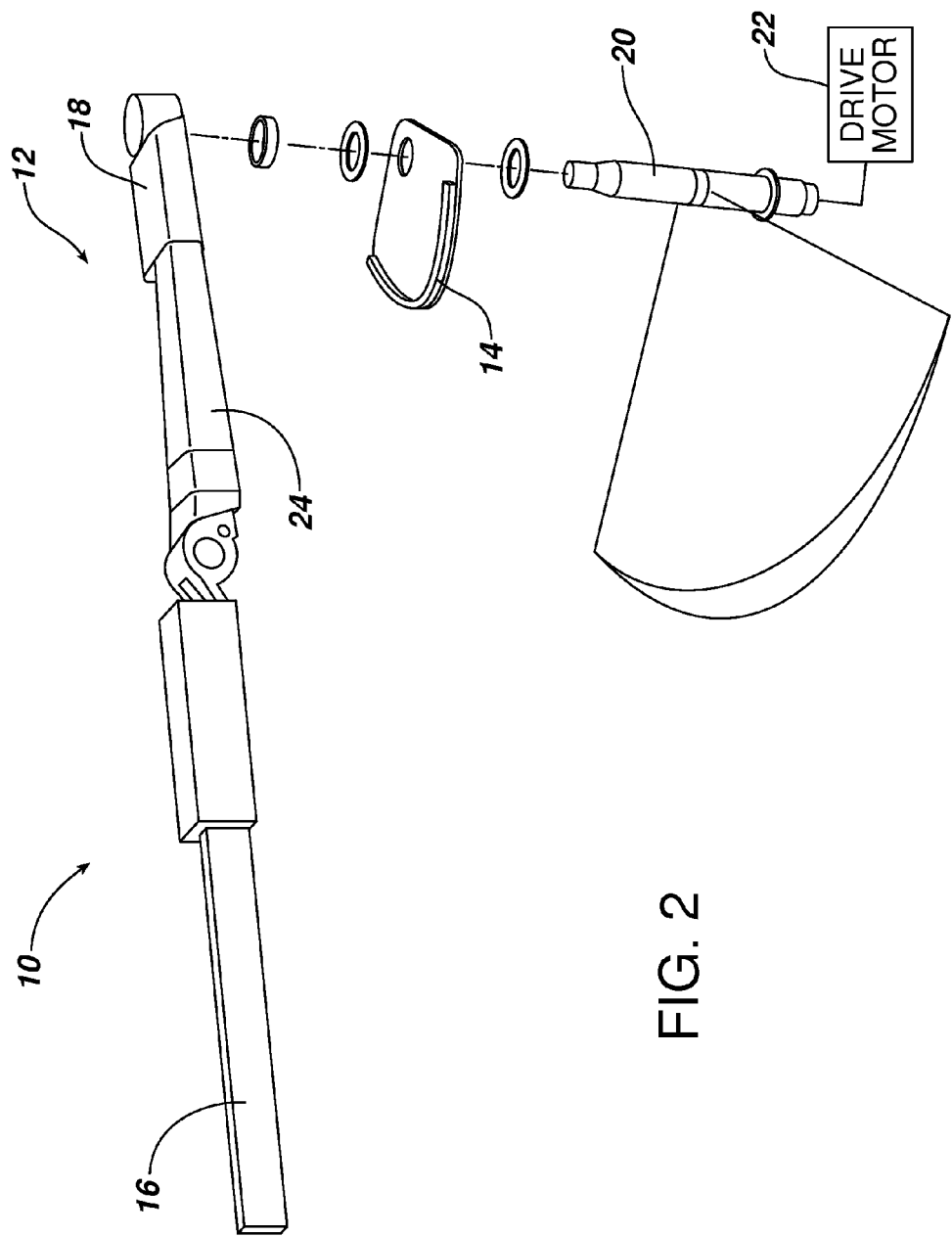
FIG. 2 is a schematical, partially exploded view of the windshield wiper assembly.

Reference is now made to FIG. 2 schematically illustrating the windshield wiper assembly 10. The wiper assembly 10 comprises a telescoping wiper head 12, a fixed guide rail 14 and a wiper blade 16. The telescoping wiper head 12 includes a first section 18 fixed to a pivot driveshaft 20 that is rotatably driven by a wiper motor 22, and a second section 24 capable of translating relative to the first section between an extended position and a retracted position. The wiper blade 16 is carried on the second section 24 of the telescoping wiper head 12. The fixed guide rail 14 engages the second section 24 and guides the second section between the extended and retracted positions. The guide rail defines a modified arc of wiper blade travel matched to the windshield being wiped so as to provide enhanced Zone B wiper coverage of the windshield.

Figure 3:
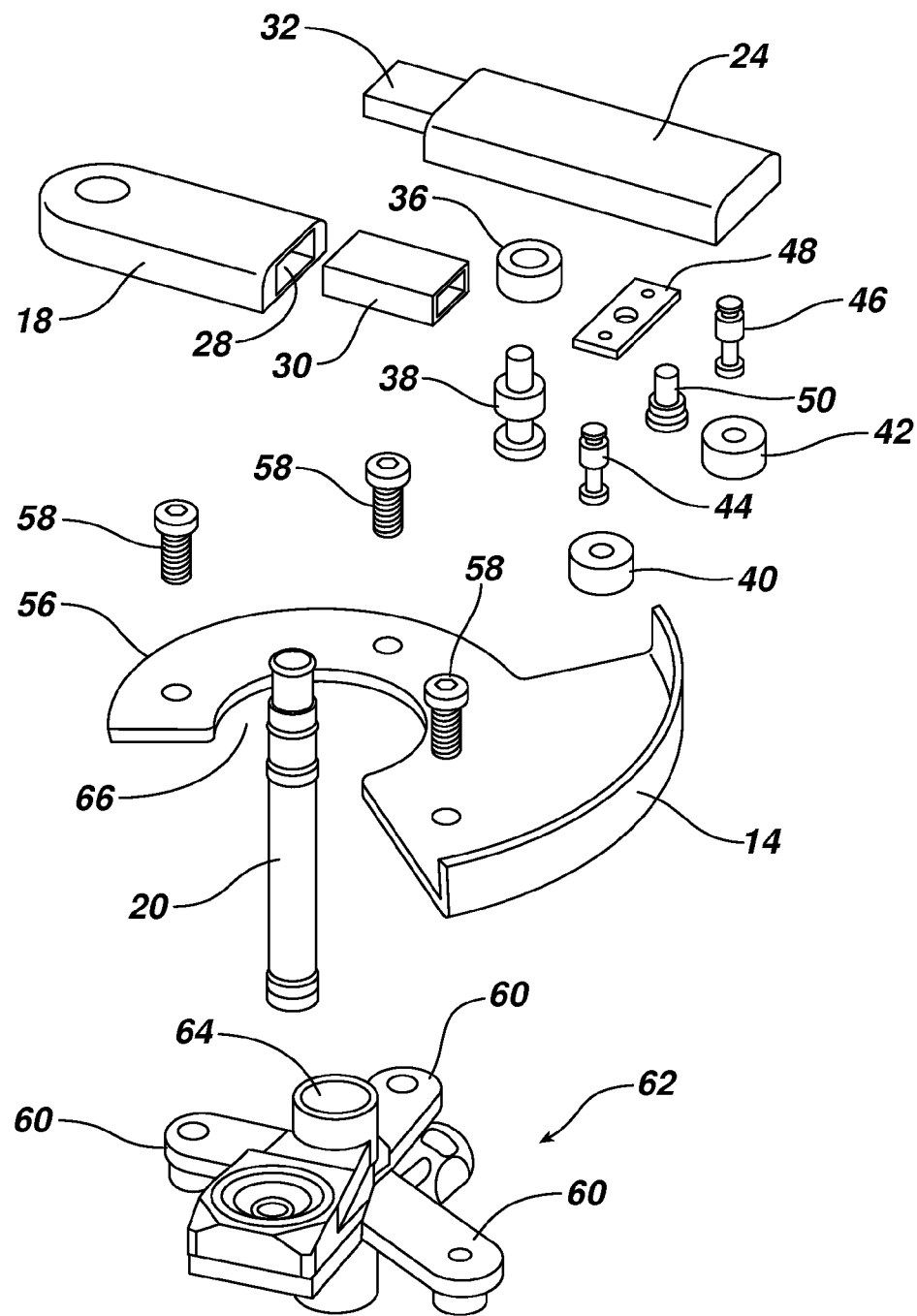
FIG. 3 is a detailed exploded perspective view of the telescoping wiper arm, the guide rail follower, the curvilinear guide rail, the pivot shaft and the pivot housing of the wiper assembly.

Reference is now made to FIGS. 3-6 illustrating the structural details of the wiper assembly 10. As best illustrated in FIG. 3, the first section 18 of the telescoping wiper head 12 includes an aperture 26 by which the first section is secured to the pivot shaft 20. In addition the first section 18 includes a socket 28 of rectangular or other cross-section that receives a slide bearing 30. The slide bearing 30 is made of a low friction material such as polytetrafluoroethylene that lines the walls of the socket 28. The second section 24 of the telescoping wiper head 12 includes a projecting lug 32 that is received within the socket 28. The low friction material of the slide bearing 30 ensures that the lug 32 freely slides within the socket 28 so that the second section 24 freely moves between the extended and retracted positions as the first section 18 of the telescoping wiper head 12 is pivoted by the pivot driveshaft 20.

Figure 1:
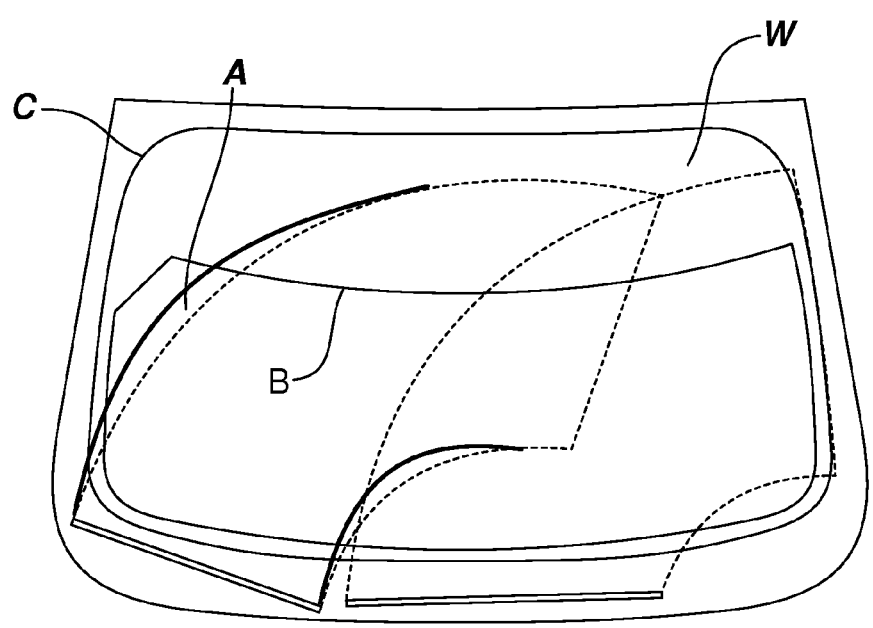
FIG. 1 is a schematic illustration of the Zone B designated area of a windshield.
Figure 4:
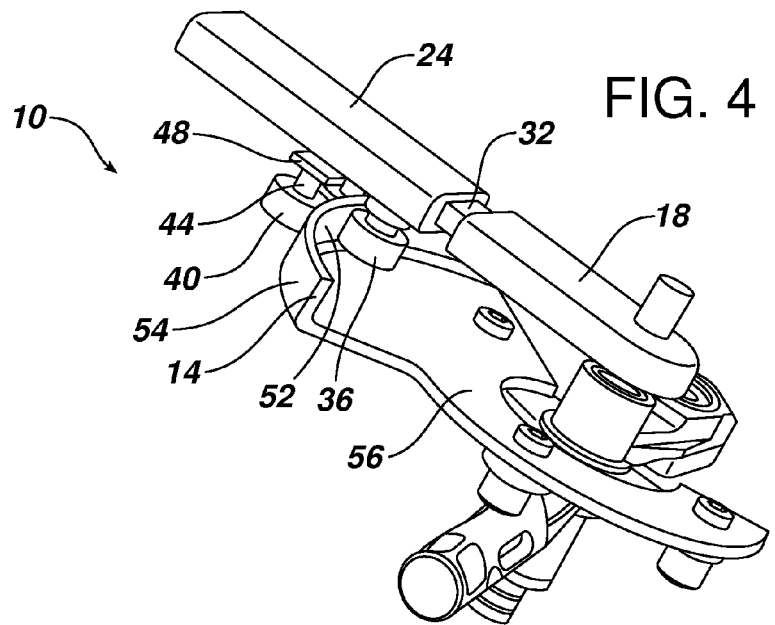
FIGS. 4 and 5 are respective perspective and top plan views of the assembled wiper assembly sans wiper blade.
Figure 6:
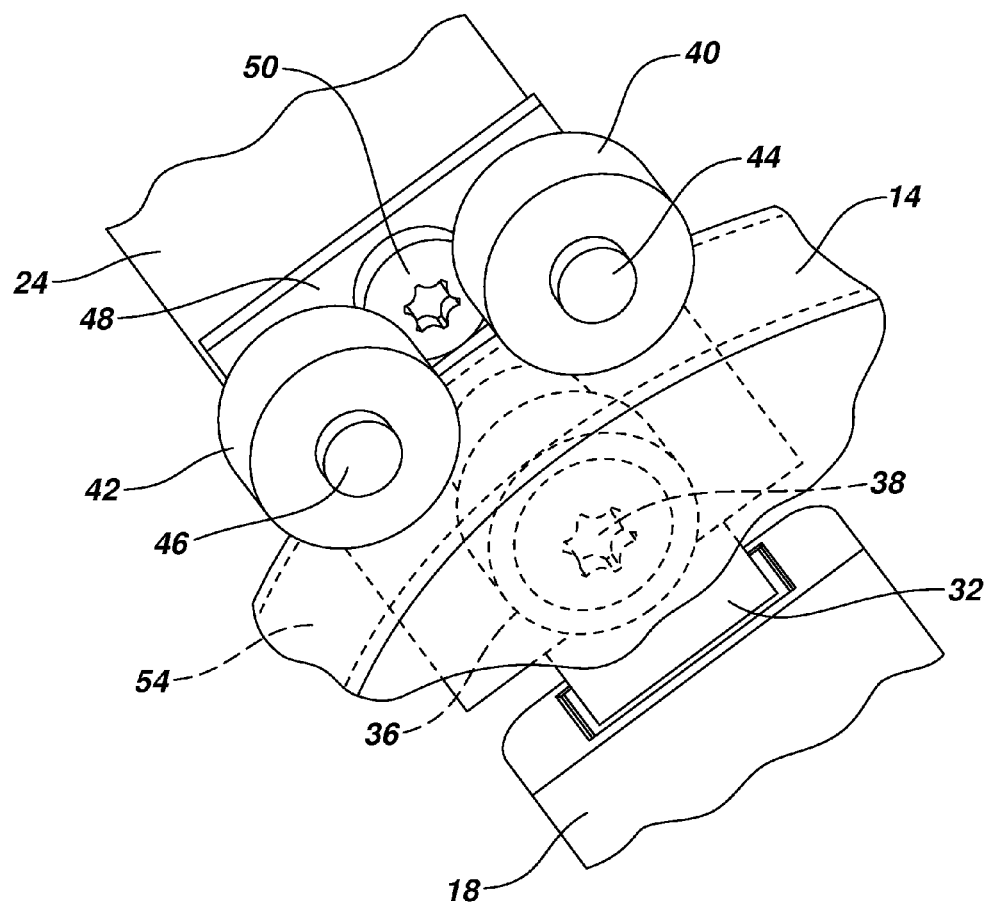
FIG. 6 is a detailed bottom perspective view illustrating how the guide rail follower engages the guide rail.

As best illustrated in FIGS. 3, 4 and 6, the second section 24 of the telescoping wiper head 12 includes a guide rail follower, generally designated by reference numeral 34. In one possible embodiment, guide rail follower 34 includes a first roller 36 connected by roller pin 38 to the second section 24. A second roller 40 and a third roller 42 are connected by respective roller pins 44 and 46 to a rotating bridge plate 48 that is connected by a roller shaft 50 to the second section 24. As best illustrated in FIGS. 4 and 6, the first roller 36 engages a first face 52 of the fixed guide rail 14 while the second and third rollers 40, 42 engage a second face 54 of that guide rail. Here it should be appreciated that the rotating bridge plate 48 carrying the second and third rollers 40, 42 ensures that all three rollers 36, 40, 42 maintain engagement with and follow the curvilinear guide rail 14 so that the second section 24 is smoothly displaced between the retracted and extended positions. Accordingly, the wiper blade 16 carried on the second section 24 is displaced through a modified arc toward the corner of the windshield (note true arc of wiper blade disclosed in dashed line versus modified arc of wiper blade due to curvilinear guide rail 14 disclosed in dashed line in FIG. 1 where the area A between the two lines represents the sweep coverage gained toward the corner C of the window W). In this way is possible to provide enhanced wiper blade coverage for Zone B without resorting to complicated and expensive n-bar wiper mechanisms of the type known in the prior art. This represents a significant benefit and advantage.

Figure 5:
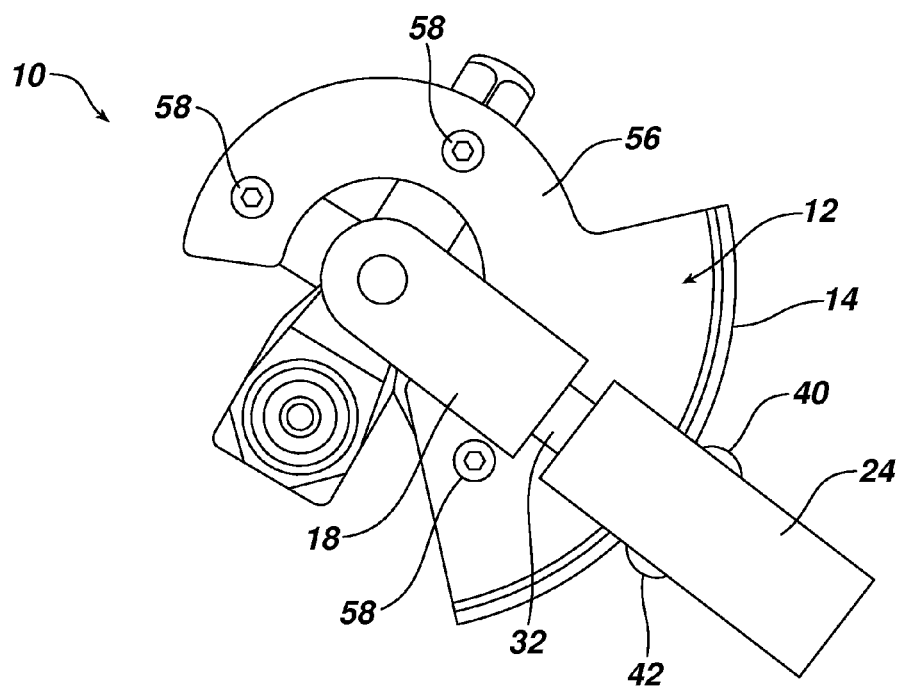

As further illustrated in FIGS. 3-5, the fixed curvilinear guide rail 14 includes a mounting base 56 that is secured by screws or other appropriate fasteners 58 to three cooperating mounting lugs 60 provided on the pivot housing 62 which is mounted directly to the vehicle. As should be appreciated, pivot housing 62 includes an aperture 64. The pivot driveshaft 20 extends through the aperture 64 so that the pivot housing 62 is concentrically received around that driveshaft. The pivot driveshaft 20 also extends through the opening 66 in the mounting base 56.

In summary, numerous benefits are provided by the wiper assembly 10. As should be appreciated, the telescoping wiper head 12 and fixed curvilinear guide rail 14 function to provide a relatively simple structure that is inexpensive to manufacture yet advantageously provides for enhanced Zone B wiper coverage. Advantageously, this structure will function reliably over a long service life and thereby represents a significant advance over the complicated and expensive n-bar wiper assemblies currently found in the prior art. Significantly, it should be appreciated that the fixed curvilinear guide rail 14 may be customized in shape to provide the desired wiper coverage of substantially any shape of rectangular windshield.

The foregoing has been presented for purposes of illustration and description. It is not intended to be exhaustive or to limit the embodiments to the precise form disclosed. Obvious modifications and variations are possible in light of the above teachings. For example, while a wiper assembly 10 for a windshield W is illustrated and described in this document, this wiper assembly may also be used on other vehicle windows such as a liftgate or hatchback window if the modified arc provided by the wiper assembly will sweep an area of the window providing the driver with an enhanced field of view in inclement weather conditions.

Figure 7:
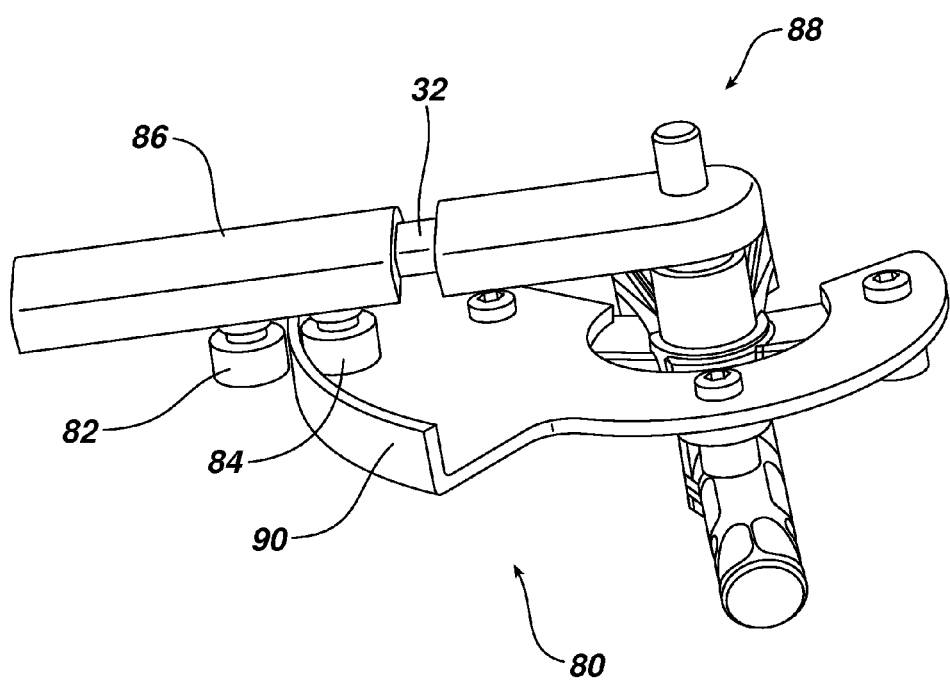
FIG. 7 is a detailed perspective view of an alternative embodiment of wiper assembly including a two roller guide rail follower.

Also, as illustrated in FIG. 7, an alternative embodiment of wiper assembly 10 may include a guide rail follower 80 having two opposed rollers 82, 84 mounted to the second section 86 of the wiper head 88 and engaging opposing faces of the guide rail 90. All such modifications and variations are within the scope of the appended claims when interpreted in accordance with the breadth to which they are fairly, legally and equitably entitled.

What is claimed:

1. A windshield wiper assembly, comprising:
   a telescoping wiper head having a first section fixed to a pivot drive shaft and a second section capable of translating relative to said first section between an extended position and a retracted position;
   a fixed guide rail engaging said second section and guiding said second section between said extended and retracted positions; and
   a wiper blade and a guide rail follower carried on said second section, wherein said guide rail follower includes a first roller and a rotating bridge plate carrying a second roller and a third roller.

2. A windshield wiper assembly, comprising:
   a pivot housing;
   a pivot shaft;
   a drive motor for rotating said pivot shaft;
   a curvilinear guide rail fixed to said pivot housing;
   a telescoping wiper arm including a first section fixed to said pivot shaft and a second section displaceable relative to said first section between a retracted position and an extended position;
   a guide rail follower carried on said second section, said guide rail follower engaging and following said curvilinear guide rail so as to displace said second section between said retracted and extended positions as said first section is pivoted by said pivot shaft, wherein said guide rail follower includes a first roller, a second roller and a third roller; and
   a wiper blade carried on said second section.

3. The wiper assembly of claim 2, wherein said first section includes a socket and said second section includes a lug that freely slides in said socket.

4. The wiper assembly of claim 3, further including a slide bearing received in said socket between said first section and said lug.

5. The wiper assembly of claim 4, wherein said guide rail follower includes a bridge plate mounted by a pivot pin to said second section.

6. The wiper assembly of claim 5, wherein said second roller and said third roller are secured to said bridge plate by mean of a second roller shaft and a third roller shaft.

7. The wiper assembly of claim 6, wherein said first roller is secured to said second section by a first roller shaft.

8. The wiper assembly of claim 7, wherein said curvilinear guide rail is engaged on a first face by said first roller and on a second face by said second and third rollers.

9. The wiper assembly of claim 8, wherein said curvilinear guide rail includes a mounting base and said pivot housing includes mounting points for engaging said mounting base.

10. The wiper assembly of claim 9, wherein said pivot shaft extends through a first opening in said pivot housing and a second opening in said mounting base.

11. A windshield wiper assembly, comprising:
- a telescoping wiper head having a first section fixed to a pivot drive shaft and a second section capable of translating relative to said first section between an extended position and a retracted position;
- a fixed guide rail engaging said second section and guiding said second section between said extended and retracted positions; and
- a wiper blade and a guide rail follower carried on said second section, wherein said guide rail follower includes opposed rollers and said guide rail passes between and engages said opposed rollers.

* * * * *